US006776933B1

(12) United States Patent
Chatwin et al.

(10) Patent No.: US 6,776,933 B1
(45) Date of Patent: Aug. 17, 2004

(54) METHOD OF MANUFACTURING A SECURITY ITEM

(75) Inventors: Charles Edward Chatwin, Horsham (GB); Christopher John Fice, Highworth (GB)

(73) Assignee: De La Rue International Limited, Hampshire (GB)

(*) Notice: Subject to any disclaimer, the term of this patent is extended or adjusted under 35 U.S.C. 154(b) by 0 days.

(21) Appl. No.: 09/622,697

(22) PCT Filed: Mar. 3, 1999

(86) PCT No.: PCT/GB99/00634

§ 371 (c)(1),
(2), (4) Date: Oct. 6, 2000

(87) PCT Pub. No.: WO99/46133

PCT Pub. Date: Sep. 16, 1999

(30) Foreign Application Priority Data

Mar. 10, 1998 (GB) .............................................. 9805111
Mar. 10, 1998 (GB) .............................................. 9805112

(51) Int. Cl.[7] .......................... B29C 47/00; B29C 47/06

(52) U.S. Cl. .......................... 264/1.34; 264/21; 264/78; 264/129; 264/132; 264/171.13; 264/171.14; 264/171.17; 264/173.12; 264/173.15; 264/173.16; 264/173.18; 264/211; 264/211.12

(58) Field of Search ....................... 264/78, 132, 173.1, 264/172.19, 171.17, 210.2, 211.12, 173.16, 173.18, 171.14, 1.34, 21, 129, 171.13, 173.12, 173.15, 211

(56) References Cited

U.S. PATENT DOCUMENTS

| | | | | | |
|---|---|---|---|---|---|
| 3,902,262 | A | * | 9/1975 | Colegrove et al. | 283/109 |
| 4,756,557 | A | | 7/1988 | Kaule et al. | |
| 5,055,345 | A | * | 10/1991 | Wank et al. | 428/215 |
| 5,350,198 | A | | 9/1994 | Bernecker | |
| 5,435,599 | A | | 7/1995 | Bernecker | |
| 5,510,074 | A | * | 4/1996 | Rose | 264/261 |
| 5,639,408 | A | | 6/1997 | King et al. | |
| 5,792,725 | A | * | 8/1998 | Simpson et al. | 428/195 |
| 5,830,561 | A | * | 11/1998 | Hagner | 428/195 |
| 5,851,615 | A | * | 12/1998 | Kay | 428/195 |
| 5,944,356 | A | | 8/1999 | Bergmann et al. | |
| 6,186,398 | B1 | * | 2/2001 | Kato et al. | 235/449 |
| 6,316,082 | B1 | * | 11/2001 | Tomkins et al. | 428/202 |

FOREIGN PATENT DOCUMENTS

| | | | |
|---|---|---|---|
| AU | 488652 | | 4/1976 |
| EP | 0 537 484 | A1 | 4/1993 |
| EP | 0 707 282 | A2 | 4/1996 |
| JP | 8-290539 | A | 11/1996 |
| WO | WO 94/15319 | A1 | 7/1994 |
| WO | WO 96/00146 | A1 | 1/1996 |

* cited by examiner

*Primary Examiner*—Leo B. Tentoni
(74) *Attorney, Agent, or Firm*—Oliff & Berridge, PLC

(57) ABSTRACT

A method of manufacturing a security item comprises coextruding at least two polymer plastic materials (6,7) with different characteristics so as to form a substrate so that neither material are biaxially oriented, and providing security indicia (14) on the substrate.

31 Claims, 1 Drawing Sheet

METHOD OF MANUFACTURING A SECURITY ITEM

BACKGROUND OF THE INVENTION

The invention relates to a method of manufacturing a security item such as a security document or card carrying security indicia.

Plastic cards have been in use for many years. Typically, there have been two types. The first, used mainly for financial cards, is made of PVC. A white PVC core is printed with the decoration or security indicia. The core can be composed either of one sheet with printing on both sides or two sheets with the front decoration printed on one, the reverse on the other. A clear laminate film is applied front and back and the three or four layer "sandwich" is then put in a press between highly polished metal plates, and under heat and pressure the layers fuse together. The process is highly labour intensive and energy inefficient. The pressing process introduces distortions which result in sophisticated registration equipment being needed to ensure that each card is diecut in the correct position. The presence of printing ink between the core and the laminate usually has an adverse effect on the bonding of the laminate. This can result in a risk of delamination and reduces the resistance of the card to flexing stress.

The resulting cards have proved acceptable for financial cards where the life is in the order of two years. They are much less successful where a long life, of say 10 years, is needed as the PVC tends to go brittle and crack with age. Personalisation of financial PVC-based cards usually involves the embossing of personalisation data, which introduces stresses into the card structure which can have an adverse effect on card life. PVC is now viewed with disfavour for environmental reasons. To overcome the deficiencies of PVC, cards of polyester and polycarbonate have been introduced. These are much more expensive, require lamination at higher temperatures and are in consequence even less energy efficient. Only certain grades of these polymers yield cards that can be embossed. However, it is only the financial card market that requires embossing; for many other applications, such as identity cards, alternative personalisation techniques that do not require embossing are becoming employed.

JP-A-8-290539 describes a polyester multi-layer film suitable for magnetic cards and in particular for pin ball cards. In particular, a laminated polyester film formed from joint extrusion laminated biaxial oriented polyester film is described, the film having a layer containing white pigments on at least the outermost layer of one side and at least one layer containing fluorescent light emitting particles. Cards of the type described in this prior art document are used for transit tickets and so on and typically have a thickness of the order of 250 microns. They are typically decorated by printing on the surface.

US-A-5830561 discloses an ID card formed by laminating together a number of coextruded polypropylene layers. This is disadvantageous in view of the number of different steps involved in the manufacturing process.

Where a card is to be used as an identity card, a range of personal information relating to the holder needs to be applied to the card. In addition to textual items such as the name and date of birth, a portrait of the holder, possibly accompanied by a biometric identifier such as a fingerprint, is required. Such personal data has to be resistant to fraudulent attack since its alteration could enable the card to be used by someone other than the cardholder. For many years, identity cards of the so-called "pouch" type have been used. In this, a piece of security printed paper with an attached photograph is sealed into a clear pouch, the pouch consisting of a folded piece of clear plastic heat seal bonded around the edges. Typically, these can survive for 10 years. However, they are falling out of favour as they lack the clean appearance of a PVC card and cannot readily conform to international standards for magnetic or smart cards. The clear heat seal plastic laminate film used in this type of card is typically formed of a biaxially oriented polyester with an adhesion promoting layer. This layer may be applied by extrusion coating or by coextrusion of a high melting point polyester with a low melting point polyester followed by biaxial orientation.

SUMMARY OF THE INVENTION

In accordance with the present invention, a method of manufacturing a security item comprises coextruding at least two polymer plastics materials with different characteristics so as to form a substrate, neither material being biaxially oriented, coextruding all the polymer plastic materials so as to form a substrate; and providing security indicia on the substrate.

The production of a coextruded substrate leads to a number of advantages. A very good bond is achieved between the two plastics materials making them much more difficult to separate than with conventional security items. This is particularly important where the plastics materials are provided as coextruded superposed layers.

We have realised that a significant disadvantage of the materials described above and in particular those described in JP-A-8-290539 is the use of biaxially oriented polyester. Although biaxial orientation gives some strength to thin films, it also has the effect of pulling the molecules together so that it is particularly difficult to get certain marking materials, particularly subliming dyes, to penetrate between them. Furthermore, biaxially oriented plastic films rarely achieve thicknesses greater than 250 microns. They are thus not suitable for many of the applications with which the present invention is concerned.

A further advantage arises from the use of plastics materials with different characteristics. These characteristics may result from using different plastics materials but in the preferred approach, arise by including a security additive in one or more of the plastics materials, that additive optionally being machine detectable. In one example, a fluorescent material can be included in one of the layers, typically an exposed layer in a superposed structure, so that if any attempt is made to remove that layer in order for example to access underlying indicia, this will become apparent when an attempt is made to validate the item by attempting to generate the fluorescence. Usually, the fluorescence will not be visible under optical irradiation so that it provides covert security.

Other security additives which could be used include optically variable materials, magnetic materials, laser writable materials and anti-stokes materials. A further possibility is to include a material in the form of particles or fibres whose distribution in an individual piece of plastic can be determined by a suitable detection system. This can form the basis of a machine verification system permitting every card to be uniquely identifiable. For example, the distribution which is determined can then be stored as security data elsewhere on the item.

In more complex arrangements, different additives could be included in different layers.

The security indicia can be provided in a variety of ways. The currently preferred approach is to print the security indicia onto a carrier such as paper using one or more inks incorporating sublimable dye(s). The carrier is then brought into contact with a surface of the substrate and heated to cause the dye(s) to sublime, transfer to the substrate and diffuse into the substrate. In another approach, the security indicia could be printed directly onto the substrate itself using inks with or without sublimable dyes. In a further alternative, inks containing sublimable dye(s) could be printed directly onto the substrate followed by the application of heat to cause the dye(s) to diffuse into the substrate.

Further advantages are achieved, particularly with superposed layers, when sublimable dye(s) are used for the security and/or personalised indicia since these can be caused to diffuse through one layer so as at least to mark an adjacent layer and preferably to diffuse into the adjacent layer. This will make it highly secure against fraud since any attempt to alter the indicia will require removal of the first layer and at least part of the second layer which would be easily detectable.

In most cases, the plastics materials will be coextruded in superposed layers. However, in some cases, one of the plastics materials may be coextruded as a strip alongside another of the plastics materials. Thus, the resulting substrate will be defined by at least two plastics materials coextruded side by side. Again, the different materials could include different additives for enhanced security.

In a preferred arrangement of this type, the strip is coextruded laterally between two other materials. In this way, the resulting substrate can be provided with the effect of a security thread or the like. Typically, the two other extruded materials are formed by the same material so that the substrate is extruded as a sandwich structure.

In some cases, a thread may be introduced into the coextrusion. Although this could be done upstream of the coextruding die, preferably the thread is introduced following the coextrusion of the plastics materials and before consolidation of the substrate so as to incorporate the thread into the substrate. Typically, following coextrusion of the materials, they will be fed to a calendering system and the thread can be introduced just upstream of that system.

The thread itself can be constructed in any conventional form and may include, for example, an optically variable structure such as a diffraction grating or hologram and/or be at least partially metallised on one surface. Any other conventional banknote-style thread could be used.

The thread may be made of PET or PET/PBT laminate with embossing directly into the PET. The thread may be embossed with a line structure to provide an optically variable effect and/or to define an increased surface area so providing a strong bond with the coextruded materials. A suitable adhesive may be provided to enhance the bond. It is important that the base material (polymer) of the thread has a melting point higher than that of the substrate material.

A further advantage of the use of a thread, when sublimable dye(s) are used, is that following the provision of security indicia (and personalised indicia if used), these can be caused to diffuse not only into the substrate but also into the thread material.

The thread may also be formed by the use of a microextruder immediately before delivering it to the calender rolls. In this form the thread is typically formed of the preferred substrate material together with appropriate security additives as indicated above. The heat from the molten polymer causes sufficient softening of the thread material to ensure fusion between the thread and the plastic sheet.

Typically, all the extruded plastics materials will be the same, a preferred material having long life durability being polybutylene terephthalate (PBT) and alloys thereof. This material has been found not only to be durable in itself but to achieve very good bonding between coextruded layers. However, in some cases, other plastics materials could be extruded such as polycarbonate, polypropylene and PET. When the same material is used, they will be distinguished by using different additives.

The security item could be used simply with the security indicia, for example as an item of currency. The invention is particularly concerned, however, with the production of identification cards and the like, the method further comprising providing personalised indicia on the substrate relating to the bearer of the security item. Conveniently, the personalised indicia is provided in a similar manner to the security indicia. Thus, the personalised indicia may be printed onto a carrier such as paper using an ink jet printer or the like with an ink containing one or more sublimable dyes. These dyes are then caused to transfer and diffuse into the substrate using the same method as using the security indicia. Other techniques as described above in connection with the security indicia could also be used to provide the personalised indicia.

In addition, one or both of the security indicia and personalised indicia could be provided by a laser writing technique if one of the plastic substrates is provided with a laser writable additive. In particular, in the case of a pair of superposed layers forming the substrate, one layer could be exposed to a laser beam through the other, the lower layer being marked if it contains a suitable additive material.

The invention is particularly suited for these applications since item thicknesses of 400 microns or more can easily be achieved thus making the invention particularly useful for manufacturing financial cards having a nominal thickness of 760 microns.

The invention is generally applicable to banknotes, cheques (whether bank or travellers), bonds, share certificates, licences, some types of identity cards, smart cards, passports, visas tickets, passbooks, vouchers, deeds, tamper revealing seals and labels, brand authenticity labels and the like. Indeed, any security item based on a plastics material could be implemented using this invention. Of course, where a flexible item is required, such as a banknote, then suitable plastics materials should be chosen, for example polypropylene.

Some examples of methods according to the invention will now be described with reference to the accompanying drawings, in which:

DETAILED DESCRIPTION OF THE PREFERRED EMBODIMENTS

Figure 1:
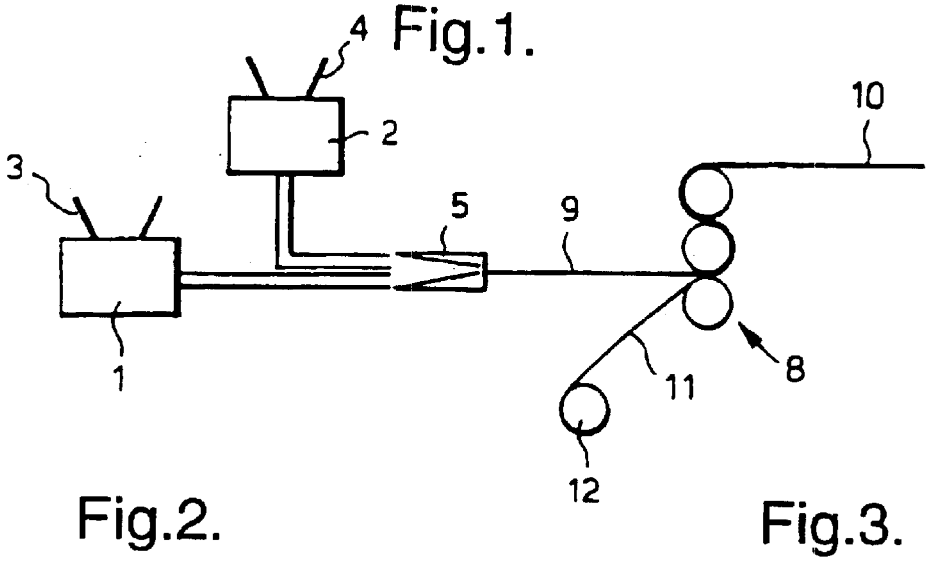
FIG. 1 is a schematic view of an example of apparatus for carrying out one example of the method.
Figure 2:
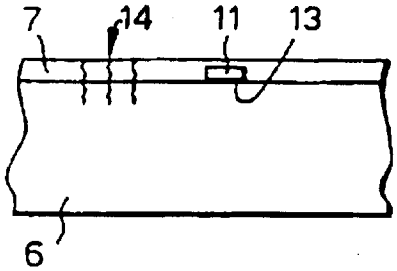
FIG. 2 is a schematic cross-section through a coextrusion produced by the apparatus shown in FIG. 1.

The apparatus shown schematically in FIG. 1 comprises first and second extrusion material supply systems 1,2 including respective screw feed devices (not shown) which feed plastics materials supplied from hoppers 3,4 to an extrusion die 5. In this example, the two plastics materials are extruded from the die 5 as a coextrusion 9 in the form of superposed layers 6,7 as shown in FIG. 2. It will be noted that no lateral stretching is imparted to the extrusion so that the extrusion is not biaxially oriented and is preferably unoriented. Each layer comprises PBT, the layer 7 having a thickness in the order of 30 microns and the layer 6 a thickness in the order of 700 microns. The coextruded layers 6,7 are then fed to a calendering stack 8 around which the coextrusion 9 extends until it is drawn away at 10 to a sheeter (not shown) where the calendered stack is cut and stacked in sheets.

A banknote-style thread 11 is supplied from a spool 12 into the calendering stack 8 for incorporation into the coextruded laminate. The thread 11 is typically made of PET or comprises a PET/PBT laminate and may be provided with any conventional banknote security feature such as a hologram or diffraction grating, Cleartext, metallisation (partial or complete) and the like. Preferably, the thread 11 is at least embossed with a line structure so as to increase its surface area to achieve a strong bond with the coextruded plastics. In addition, the thread is preferably provided with an adhesive layer 13 as shown in FIG. 2. The thread may also have a feature on its reverse side that contains digital information which is machine readable.

Once the coextrusion has been completed, it will then be supplied to a security printing station where security indicia such as rainbow printing, microtext, guilloche patterns and the like are provided on the upper surface of the layer 7. As previously mentioned, the security indicia will initially be printed on a paper carrier in a conventional manner using a printing technique suitable to the particular type of security indicia involved. Examples of printing techniques include offset lithographic, intaglio, letterpress, gravure and flexographic printing. The printing will be carried out using one or more inks which contain sublimable dye(s) and these inks are then brought into contact with the sheeted coextrusion. Heat (and pressure) is then applied to cause the dye(s) to diffuse through the layer 7 into the layer 6 as shown schematically at 14 in FIG. 2. Where the layer 7 has a thickness of about 30 microns, the inks or dyes can diffuse typically to a total depth of about 50 microns.

It will be appreciated from FIG. 2 that any attempt to remove the layer 7 in order to change the security indicia will fail because indicia extend into the layer 6.

An important security feature is achieved by providing one or more additives in one or more of the plastics materials supplied to the die 5. For example, the material used for the layer 7 could be provided with a UV reactive fluorescent material which fluoresces red when interrogated under non-optical radiation within the UV part of the spectrum. This will not normally be detectable to the naked eye and will only become apparent when viewed under non-optical radiation. If the layer 7 was removed by abrasion or the like and replaced with an apparently similar material, the resulting laminate would appear different under the non-optical radiation in view of the absence of the red fluorescence. Further security could be achieved by incorporating a different fluorescent material in the layer 6, for example a material which fluoresces green when irradiated under non-optical radiation. Other techniques for introducing different characteristics to the two layers are mentioned earlier.

The provision of the thread 11 leads to even further security since such threads are difficult to fabricate and are likely to be destroyed when any attempt is made to abrade the layer 7. Furthermore, the thread 11 is spaced from the exposed surf ace of the layer 7 which is thus smooth.

Figure 3:
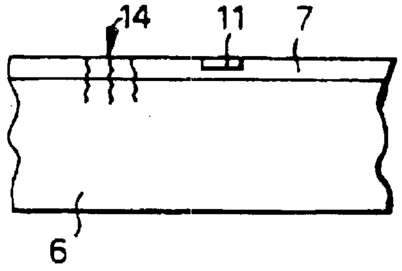
FIG. 3 is a view similar to FIG. 2 but of a second example.

In some cases, the thread 11 may just be forced into the layer 7 so as to be flush with the surface of the layer 7 as shown in FIG. 3.

Figure 4:
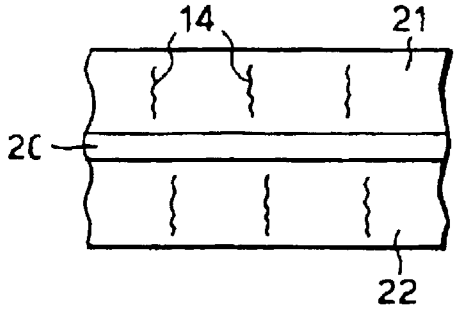
FIG. 4 is a schematic plan of a third example of a coextrusion.

In the examples described so far, the materials have been extruded in a superposed form. In another example, the materials could be extruded side by side. Two or more such materials could be extruded in this way and FIG. 4 illustrates a coextrusion of three materials requiring three separate extruders leading to a single die. This results in a central strip 20 provided on either side by wider strips 21,22. This coextruded, lateral arrangement would then be calendered as before followed by security printing and diffusion as shown at 14.

In the preferred example, the strip 20 provides a different optical response to the strips 21,22, which in turn may provide the same or different optical responses as each other. Typically, the strips 21,22 are opaque so as to carry the security printing. The strips 20–22 will typically all be made of the same polymer such as PBT.

Figure 5:
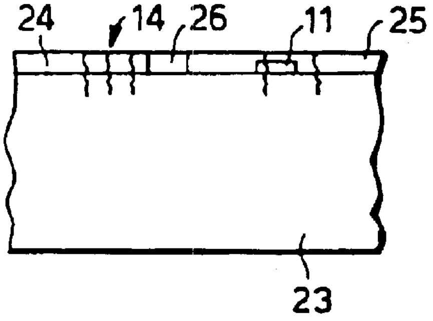
FIG. 5 is a cross-section through a fourth example of a coextrusion.

FIG. 5 shows a further example which is a combination of the examples shown in FIGS. 2 and 4. Thus, four different materials are coextruded to generate a primary layer 23 on which is superposed a pair of lateral strips 24,25 and a central strip 26. Security printing 14 is provided as before which diffuses into the layer 23 and a thread 11 is included.

Security items can be mass produced by dividing the resultant coextruded sheets into separate elements and typically for mass production, such elements will extend laterally across the extruded web as well as along it.

Figure 6:
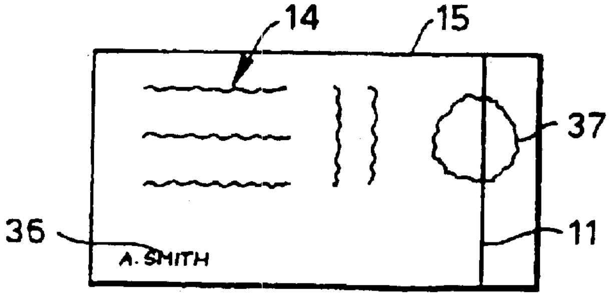
FIG. 6 is a schematic plan view of a finished identification card.

If the security item is to constitute a security card or other identification card carrying personalised indicia, the security printed material will be fed to a personalisation station. Here personalised information, such as the bearer's name 36 and photoimage 37, onto the exposed surface of the material (FIG. 6). Conveniently, this information will be provided in substantially the same way as with security indicia. Thus, the personalised information will be printed using, for example, an ink jet printer with inks including one or more sublimable dyes onto paper which is then brought into contact with the surface of the security item. The sublimable dyes are then caused to diffuse into the security item upon application of heat. This diffusion significantly enhances the security of the finished product.

It will be seen in FIG. 6 that the security thread 11 is offset to one side of the identification card but the photoimage 37 overlaps the security thread. This provides additional security since following diffusion, the dyes used for the photoimage will diffuse into the thread making it even more difficult to replace the photoimage.

It will be noted that in contrast to conventional security cards and the like, it is not necessary to provide protective overlayers. Since the dyes are caused to diffuse through one layer into the next, it is very difficult to change the indicia while the card is resistant to abrasion and the like through normal use. PBT based cards have also been found to be very durable and to pass extensive flex tests, achieving more than one hundred times the requirements of the current international standard.

What is claimed is:

1. A method of manufacturing a plastics security item having a plurality of polymer plastics materials, at least two of which have different characteristics, the method comprising coextruding together at the same time all the polymer plastic material making up the item so as to form a substrate, none of the plastic materials being biaxially oriented; and providing security indicia on the substrate to form the plastic security item.

2. A method according to claim 1, wherein the plastic materials are coextruded as superposed layers.

3. A method according to claim 2, wherein one of the layers has a thickness in the range 20–40 micron.

4. A method according to claim 2, wherein one of the layers has a thickness in the order of 700 micron.

5. A method according to claim 1, wherein one of the plastic materials is coextruded as a strip alongside another of the plastic materials.

6. A method according to claim 5, wherein the strip is coextruded lateral between two other materials.

7. A method according to claim 1, wherein the security item has a thickness not less than 400 microns.

8. A method according to claim 1, wherein the materials comprise different polymers.

9. A method according to claim 1, further comprising introducing a thread into the coextruded material.

10. A method according to claim 9, wherein the thread is introduced following coextrusion of the plastic materials and the coextruded materials form the substrate so as to incorporate the thread into the substrate.

11. A method according to claim 1, wherein following extrusion of the plastic materials, the extrusion is calendered.

12. A method according to claim 10, wherein the thread is introduced upstream of the calendaring step.

13. A method according to claim 9, wherein the thread defines an optically variable structure such as a diffraction grating or hologram.

14. A method according to claim 9, wherein the thread is at least partially metallised on one surface.

15. A method according to claim 9, wherein the plastic materials are coextruded as superposed layers, and the thread to provided between superposed layers of the materials.

16. A method according to claim 1, wherein at least one of the plastic materials includes a security additive.

17. A method according to claim 16, wherein the security additive is machine detectable.

18. A method according to claim 16, wherein the security additive includes one or more of a fluorescent material, an optically variable material, a magnetic material, a laser writable material and an anti-stokes material.

19. A method according to claim 16, wherein each of the plastic materials includes a different security additive.

20. A method according to claim 1, wherein at least one of the plastic materials is polybutyleneteraphthalate.

21. A method according to claim 1, wherein the security indicia are provided using one or more sublimable dyes, the method further comprising causing the dye(s) to diffuse into the substrate.

22. A method according to claim 21, wherein the sublimable dye(s) are contained within an ink or toner.

23. A method according to claim 21, wherein the security indicia are provided on a carrier, the carrier is brought into contact with the substrate, and the dye(s) are then caused to transfer from the carrier and diffuse into the substrate.

24. A method according to claim 9, wherein the plastic materials are coextruded as superposed layers, and wherein the diffusing step comprises causing the dye(s) to diffuse through one layer so as at least to mark an adjacent layer.

25. A method according to claim 24, wherein the dye(s) diffuses into the adjacent layer.

26. A method according to claim 1, wherein the security indicia are printed on the carrier or substrate by gravure, offset lithographic, intaglio, letterpress or flexographic printing process.

27. A method according to claim 1, further comprising providing personalized indicia on the substrate relating to the bearer of the security item.

28. A method according to claim 27, wherein the personalized indicia are provided on a carrier using sublimable dye(s), the carrier is brought into contact with the substrate, and the dye(s) are then caused to transfer from the carrier and diffuse into the substrate.

29. A method according to claim 1, wherein the plastic materials comprise the same polymer.

30. A method according to claim 19, wherein two of the plastic materials contain different fluorescent materials.

31. A method according to claim 1, wherein the plastic materials are opaque.

* * * * *